(12) United States Patent
Kim et al.

(10) Patent No.: US 8,279,448 B2
(45) Date of Patent: Oct. 2, 2012

(54) SHAPE MEASUREMENT APPARATUS AND METHOD

(75) Inventors: Jae-wan Kim, Daejeon (KR); Tae-bong Eom, Daejeon (KR); Jong-ahn Kim, Daejeon (KR); Chu-shik Kang, Daejeon (KR)

(73) Assignee: Korea Research Institute of Standards and Science (KR)

( * ) Notice: Subject to any disclaimer, the term of this patent is extended or adjusted under 35 U.S.C. 154(b) by 247 days.

(21) Appl. No.: 12/676,245

(22) PCT Filed: Aug. 19, 2008

(86) PCT No.: PCT/KR2008/004810
§ 371 (c)(1),
(2), (4) Date: Mar. 3, 2010

(87) PCT Pub. No.: WO2009/031770
PCT Pub. Date: Mar. 12, 2009

(65) Prior Publication Data
US 2010/0182614 A1 Jul. 22, 2010

(30) Foreign Application Priority Data
Sep. 7, 2007 (KR) .................. 10-2007-0091213

(51) Int. Cl.
*G01B 11/02* (2006.01)
*H01S 3/13* (2006.01)
(52) U.S. Cl. .................................. 356/511; 372/32
(58) Field of Classification Search .......... 356/489, 356/511–514; 372/29.02, 32
See application file for complete search history.

(56) References Cited

U.S. PATENT DOCUMENTS

| | | | | |
|---|---|---|---|---|
| 4,907,237 A | * | 3/1990 | Dahmani et al. | 372/32 |
| 5,077,748 A | | 12/1991 | Kozlovsky et al. | |
| 6,717,679 B2 | * | 4/2004 | Kuchel | 356/513 |
| 6,882,666 B2 | | 4/2005 | Kazarinov et al. | |

FOREIGN PATENT DOCUMENTS

| JP | 05206561 A * | 8/1993 |
|---|---|---|
| JP | 2002-071327 | 3/2002 |

OTHER PUBLICATIONS

International Search Report-PCT/KR2008/004810 dated Dec. 18, 2008.

* cited by examiner

*Primary Examiner* — Michael A Lyons
(74) *Attorney, Agent, or Firm* — Cantor Colburn LLP

(57) ABSTRACT

A shape measurement apparatus and method using a laser interferometer are disclosed. The shape measurement apparatus includes a plurality of laser devices, which generate beams, emit a beam of a specific frequency from among the generated beams, and output interference signals for detecting wavelengths of the generated beams, and a controller for detecting the wavelengths of the generated beams from the outputted interference signals, and controlling the laser devices on the basis of the detected wavelengths. The optical unit projects the beam of the laser device on a target object, and generates an interference pattern of the object. Several shutters are closed and opened. If the shutters are closed, they prevent the beam of each laser device to be projected on the optical unit. An image pickup unit captures the interference pattern.

14 Claims, 23 Drawing Sheets

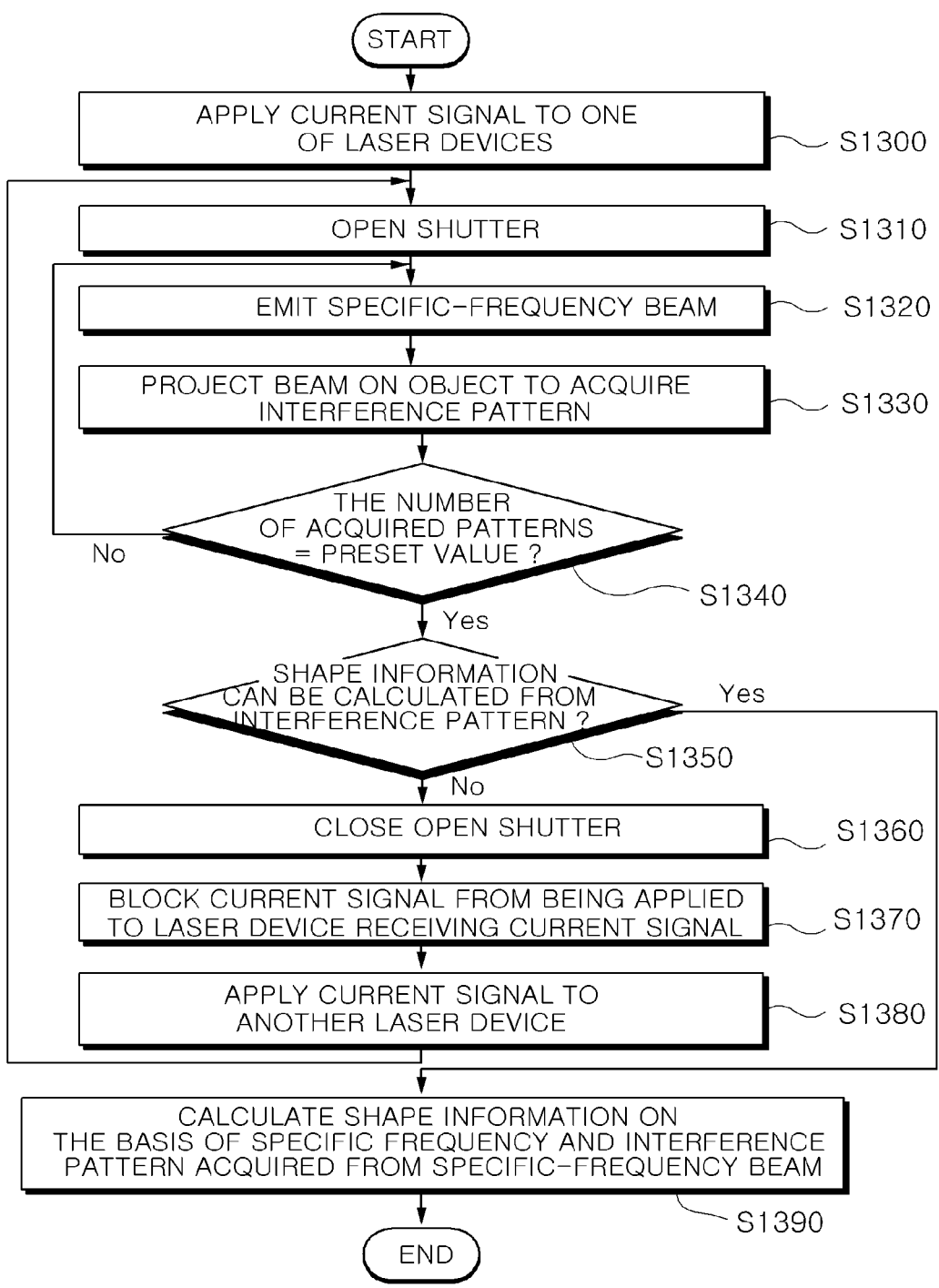

SHAPE MEASUREMENT APPARATUS AND METHOD

BACKGROUND OF THE INVENTION

1. Field of the Invention

The present invention relates to a shape measurement apparatus and method, and more particularly to an apparatus and method for measuring a nano-sized shape through optical interference.

2. Description of the Related Art

A three-dimensional shape measurement apparatus illuminates a specific-shaped light beam on an object to be measured to form an interference pattern, measures the interference pattern, and analyzes the measured interference pattern, such that it acquires information indicating the height of the object. This measurement method can easily acquire a three-dimensional (3D) shape of the object, such that it has been widely used for medical and industrial fields. Specifically, the rapid technical development in all industrial fields requires micro-fabrication in semiconductors, microelectromechanical systems (MEMS), flat panel displays, and optical components. Presently, the micro-fabrication has been rapidly introduced to nano-sized super-precision fabrication technologies. Fabrication shapes required for the nano-sized super-precision fabrication technologies have been changed from two-dimensional (2D) shapes to three-dimensional (3D) shapes. Thus, the importance of the three-dimensional microfabrication measurement technology is also rapidly increasing.

Conventionally, a three-dimensional (3D) shape measurement method based on an optical phase shifting interferometer (PSI) has been widely used. The basic measurement principles of the above-mentioned PSI technology are as follows. In more detail, a light beam generated from a light source is illuminated on individual reference planes and measurement planes, and the individual light beams are collected by a beam splitter, such that images of measurement surfaces and striped interference signals are formed. Thereafter, the above-mentioned conventional PSI method calculates phases of the interference signals generated from optical detection elements are calculated such that the height of the object is measured. The above-mentioned PSI method called an interference signal tracking method considers that an interval between the interference signals corresponds to a half-wavelength of a light-source wavelength, and interpolates a variation of interference signals with a harmonic function, such that it indirectly calculates the phase of the interference signal.

The above-mentioned PSI performs a measured-modulo operation on the value of $2\pi$, and assumes that an optical path difference (OPD) between neighboring pixels is one-half of a wavelength so as to remove inconsistency of $2\pi$ between measured phase data. Therefore, if a slope of an object surface is very high such that a phase variation between neighboring pixels is higher than a specific value of $\pi$, the phase measurement result may be deteriorated.

The conventional PSI continuously moves a reference plane at least three times by a predetermined phase simultaneously while allowing the optical detection element to measure an interference pattern at least three times, and compares a relative phase difference in wavefront between a measurement light speed and a reference light speed, such that it measures the height of an object surface. Therefore, the conventional PSI must measure the height of the object surface simultaneously while moving the reference plane in the direction of an upper part of the measurement surface at regular intervals, such that it requires a long period of a measurement time and is unable to correctly and precisely measure a shape of the object due to a position error caused by mechanical movement.

SUMMARY OF THE INVENTION

Accordingly, the present invention is directed to a shape measurement apparatus and method that substantially obviate one or more problems due to limitations and disadvantages of the related art.

It is an object of the present invention to provide a shape measurement apparatus and method for solving problems of a phase shifting interferometer (PSI) which allows a measurement area of a step height to be limited to ¼ of a wavelength, such that it can measure the shape of a target object without any errors although the step height is very high. Also, the shape measurement apparatus and method can quickly and correctly measure the shape of a target object without mechanically shifting a current position of a reference plane to another position.

In order to solve the above-mentioned technical problems, the present invention may acquire a phase-shifted image using a laser device capable of precisely scanning a frequency, such that it substitutes for the mechanical phase shifting method. In order to increase a measurement area of a step height, the present invention may use two frequency scanning laser devices at different wavelengths.

In accordance with one aspect of the present invention, the above and other objects can be accomplished by the provision of a shape measurement apparatus comprising: a plurality of laser devices which generate beams, emit a beam of a specific frequency from among the generated beams, and output interference signals for detecting wavelengths of the generated beams, respectively; and a controller for detecting the wavelengths of the generated beams from the outputted interference signals, and controlling the laser devices on the basis of the detected wavelengths.

The laser device may include: a semiconductor laser for generating the beam; an interference signal generator which generates the interference signal for detecting the wavelength of the generated beam, and outputs the generated interference signal; an external reflector which has the specific frequency serving as a resonance frequency, receives the generated beam, and feeding back the received beam to the semiconductor laser when a frequency of the received beam is equal to the resonance frequency; and an optical transmission unit for emitting the generated beam to an external part when the external reflector feeds back the received beam.

The controller may drive the laser devices by turns. The controller may control the driven laser device to emit four specific-frequency beams. The controller may control the laser devices by adjusting a temperature or each laser device or a current signal applied to each laser device.

The apparatus may further comprises: an optical unit for allowing the emitted beams to be projected on a surface of a target object to be measured, and generating an interference pattern of the target object; a plurality of shutters for preventing the emitted beams from being illuminated on the optical unit while they are open and closed; and an image pickup unit for capturing an image of the generated interference pattern. The controller may allow the emitted beams to be illuminated on the optical unit by opening any of the shutters. The controller may acquire the captured interference pattern of each beam of the specific frequency. The controller may calculate shape information of the target object on the basis of the acquired interference pattern in association with not only the specific frequency but also individual beams of the specific frequency.

In accordance with another aspect of the present invention, there is provided a method for measuring a shape using a plurality of laser devices comprising: a) driving any one of the laser devices; b) emitting a plurality of specific-frequency beams from among the driven laser device, allowing each of the emitted specific-frequency beams to be projected on a target object, and acquiring an interference pattern of the target object in association with each of the specific-frequency beams; and c) stopping the driven laser device, and driving the other one from among the plurality of laser devices.

The step a) of driving any one of the laser devices may include: applying a current signal to any one of the laser devices; and opening a shutter for blocking the beam emitted from the laser device having received the current signal. The step b) of acquiring the interference pattern may include: b-1) emitting the beam of the specific frequency via the driven laser device; and b-2) acquiring the interference pattern of the target object by projecting the emitted beam on the target object. The beam emitting step b-1) may include: detecting a wavelength of the beam generated by the driven laser device; adjusting a current signal applied to the laser device on the basis of the detected wavelength; detecting a resonance frequency of the beam; and emitting the beam as the specific-frequency beam when the resonance frequency of the beam is detected. The step c) of driving the other one from among the plurality of laser devices may include: closing a shutter which blocks the beam emitted from the driven laser device; preventing a current signal from being applied to the driven laser device; applying a current signal to the other one from among the laser devices; and opening the shutter which blocks the beam emitted from the laser device having received the current signal.

The method may further comprise: calculating shape information of the target object on the basis of the interference pattern acquired from the specific beam and the specific-frequency beam.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 23 is a flow chart illustrating a shape measurement method according to the present invention.

DESCRIPTION OF THE PREFERRED EMBODIMENTS

Figure 1:
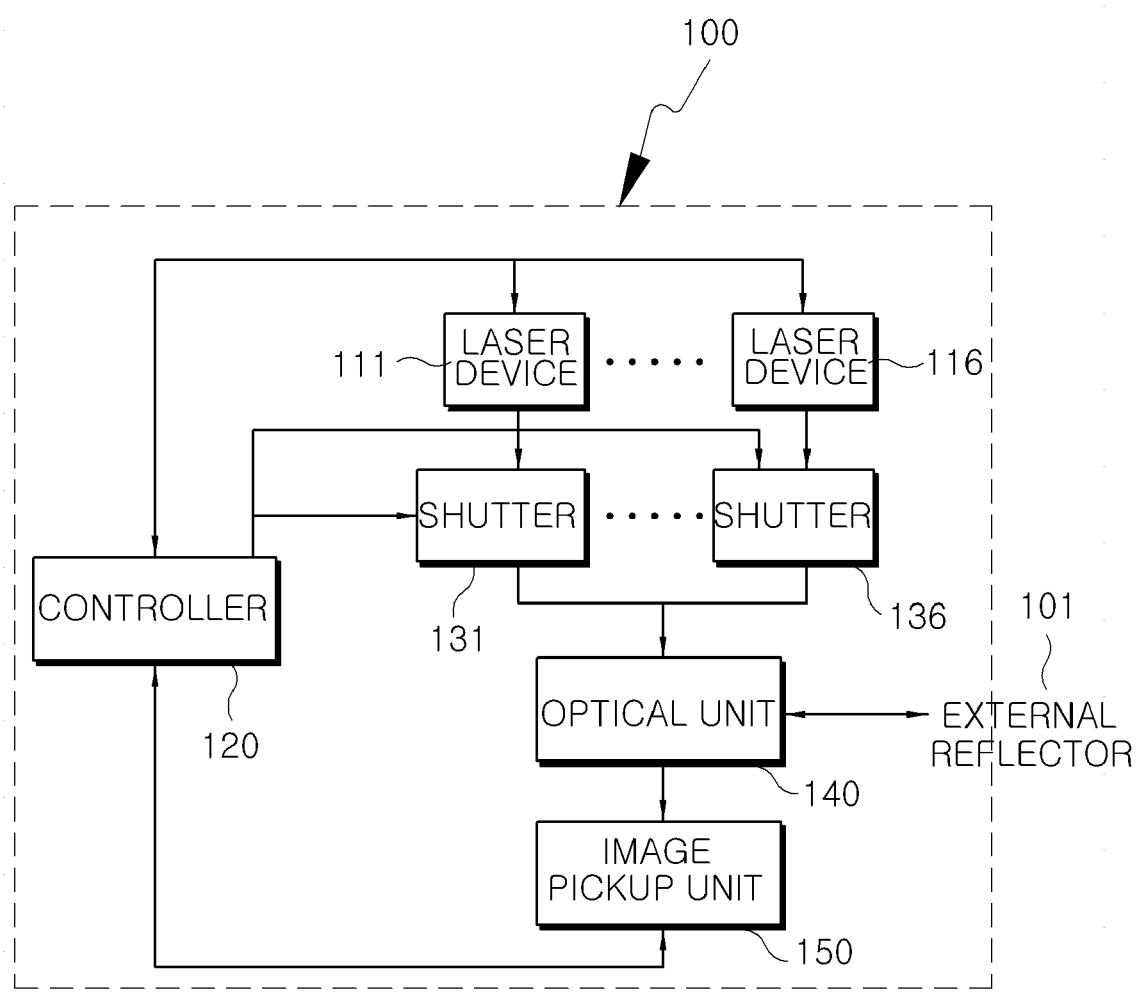
FIG. 1 is a block diagram illustrating a shape measurement apparatus according to the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear. A shape measurement apparatus and method according to the present invention will hereinafter be described in detail.

FIG. 1 is a block diagram illustrating a shape measurement apparatus according to the present invention.

Referring to FIG. 1, the shape measurement apparatus 100 according to the present invention includes a plurality of laser devices 111 and 116, a controller 120, shutters 131 and 136, and an image pickup unit 150.

Figure 2:
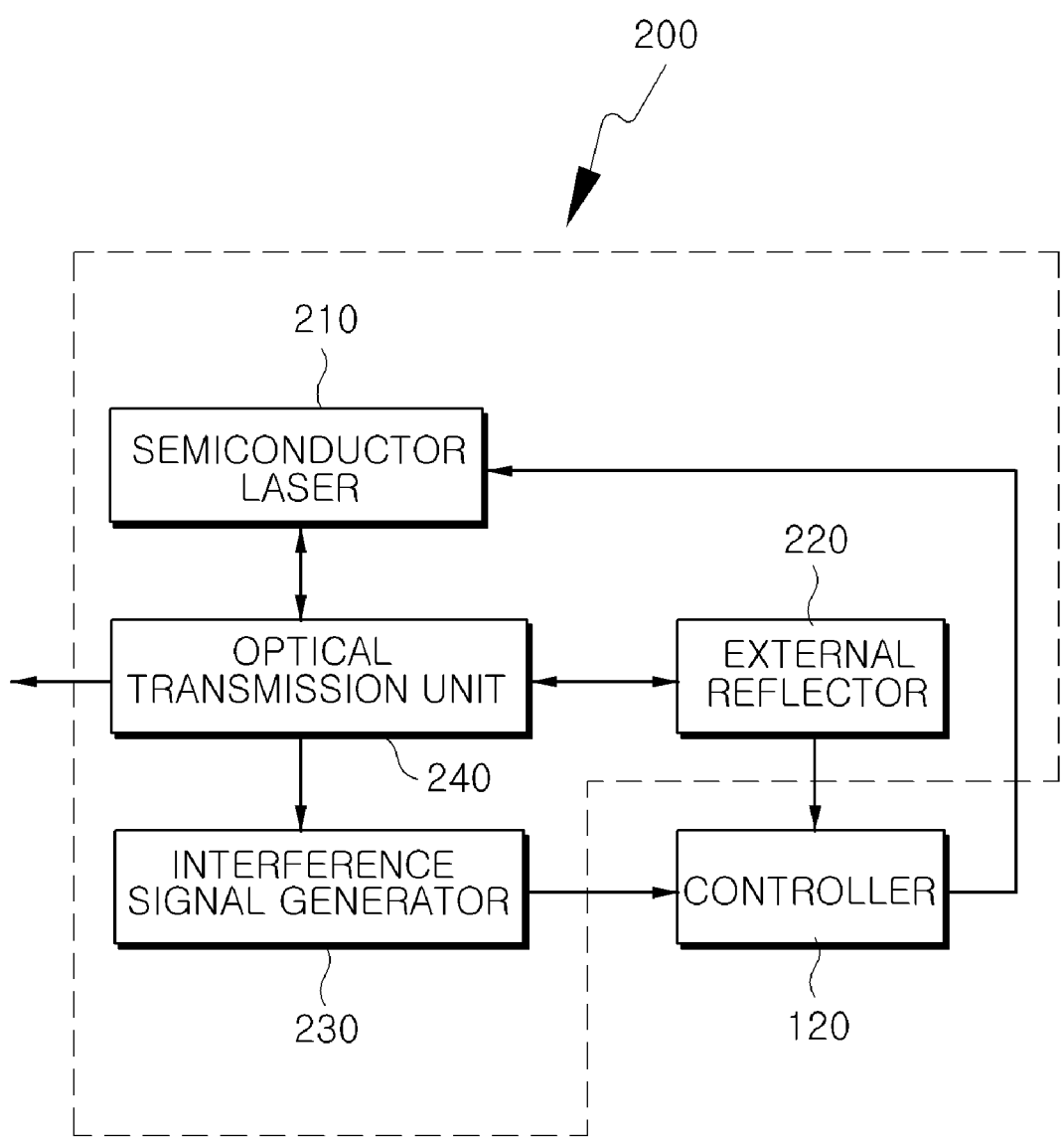
FIG. 2 is a block diagram illustrating a laser device of a shape measurement apparatus according to the present invention.

FIG. 2 is a block diagram illustrating a laser device of a shape measurement apparatus according to the present invention.

Referring to FIG. 2, the laser unit 111 or 116 generates light beams, emits a specific-frequency beam among the generated beams, and outputs an interference signal for detecting wavelengths of the generated beams. For this purpose, the laser device 200 includes a semiconductor laser 210, an external reflector 220, an interference-signal generator 230, and an optical transmission unit 240.

The semiconductor laser 210 generates a beam, a frequency or wavelength of the generated beam is adjusted by the controller 120. By a beam fed back from the external reflector 220, the semiconductor laser 210 emits a beam locked at a resonance frequency of the external reflector 220.

The external reflector 220 has a resonance frequency. If the frequency of one beam generated by the semiconductor laser 210 is equal to that of the other beam generated by the semiconductor laser 210, the beam emitted from the semiconductor laser 210 is fed back to the semiconductor laser 210. By this beam fed back to the semiconductor laser 210, the beam emitted from the semiconductor laser 210 is locked at the resonance frequency. In this case, the semiconductor laser 210 emits a beam having a stable frequency. For example, a single reflection mirror, an optical grating, an optical fiber resonator, or a Fabry-Perot resonator may be used as the above external reflector 220.

Figure 3:
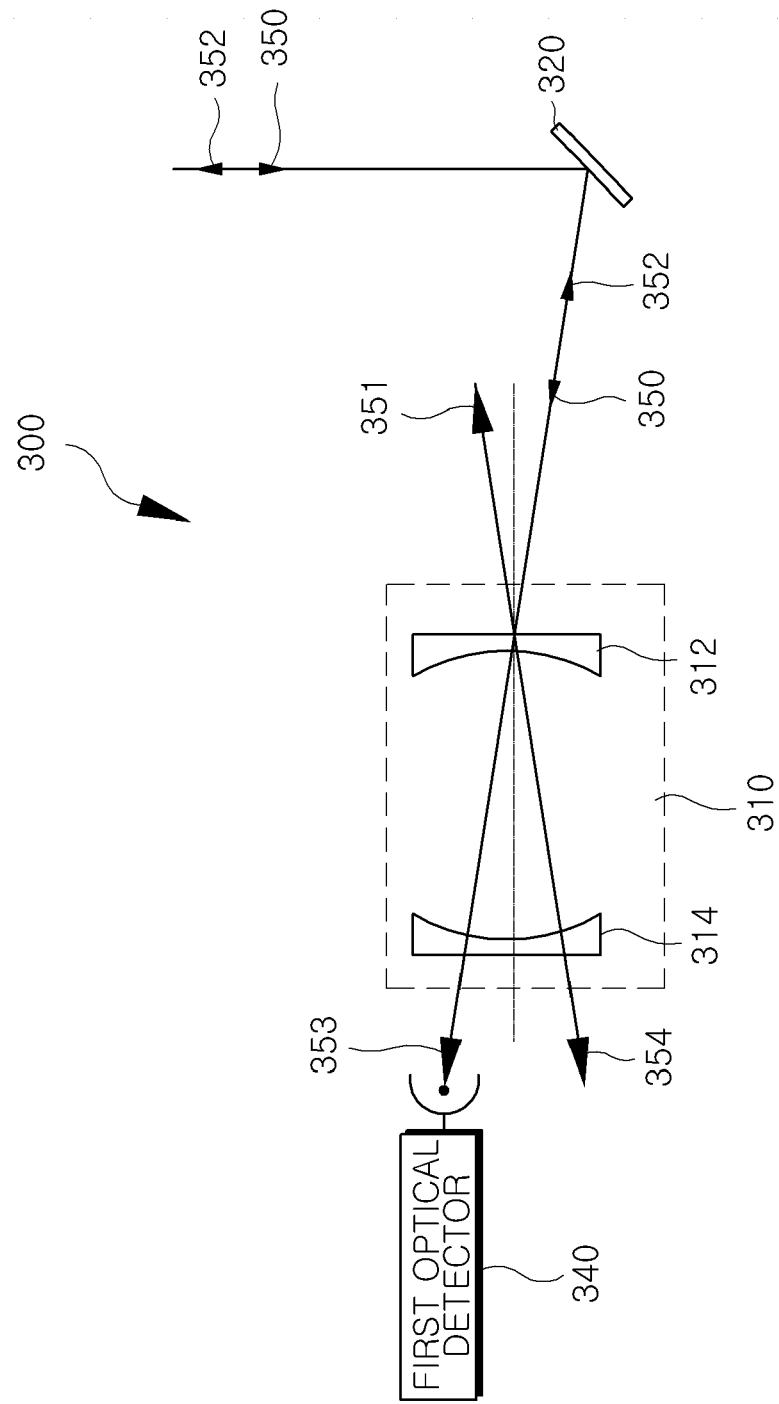
FIG. 3 shows an external reflector for use in the shape measurement apparatus according to the present invention.

FIG. 3 shows an external reflector for use in the shape measurement apparatus according to the present invention.

Referring to FIG. 3, the external reflector 300 includes an optical resonator 310, a first means 320, a second means 320, and a first optical detector 340.

The optical resonator 310 has a resonance frequency. If a frequency of one beam emitted from the semiconductor laser 210 is equal to the resonance frequency, the optical resonator 310 amplifies and outputs an inclined beam, such that the frequency of one beam is fed back to the semiconductor laser 210. For this purpose, the optical resonator 310 includes two reflection mirrors 312 and 314. For example, the two reflection mirrors 312 and 314 are spaced apart from each other by a predetermined length corresponding to a radius of curvature.

The first means 320 for illuminating the beam emitted from the semiconductor laser 210 on the optical resonator 310 may be equal to the second means 320 for feeding back the beam amplified by the optical resonator 310 to the semiconductor laser 210.

The first means 320 allows the beam 350 emitted from the semiconductor laser 210 to be incident on the reflection mirror 312. The beam incident on the reflection mirror 312 is divided into four beams 351, 352, 353, and 354 by the optical resonator 310, such that the optical resonator 310 outputs the four beams 351, 352, 353, and 354. In this case, the beam 351 includes a first beam reflected from the reflection mirror 312 and a second beam transmitted from the resonance area of the optical resonator 310. If the frequency of a beam emitted from the semiconductor laser 210 is equal to a resonance frequency, this beam has a minimum power. On the other hand, the beams 352, 353, and 354 are transmitted from the resonance area of the optical resonator 310. So, if the frequency of the beam emitted from the semiconductor laser 210 is equal to the resonance frequency, each beam 352, 353, or 354 has a maximum power. If the beam 352 has a maximum power, this beam 352 is fed back to the semiconductor laser 210 by the second means 320.

The first optical detector 340 detects the beam 353 transmitted from the optical resonator 310. The controller 120 determines the presence or absence of resonance in the beam 353 detected by the first optical detector 340. If the presence of resonance in the beam 353 is determined, the frequency of the beam 353 is detected as a resonance frequency. In this case, the beam from which the resonance frequency is detected is emitted as a beam of a specific frequency.

Figure 4:
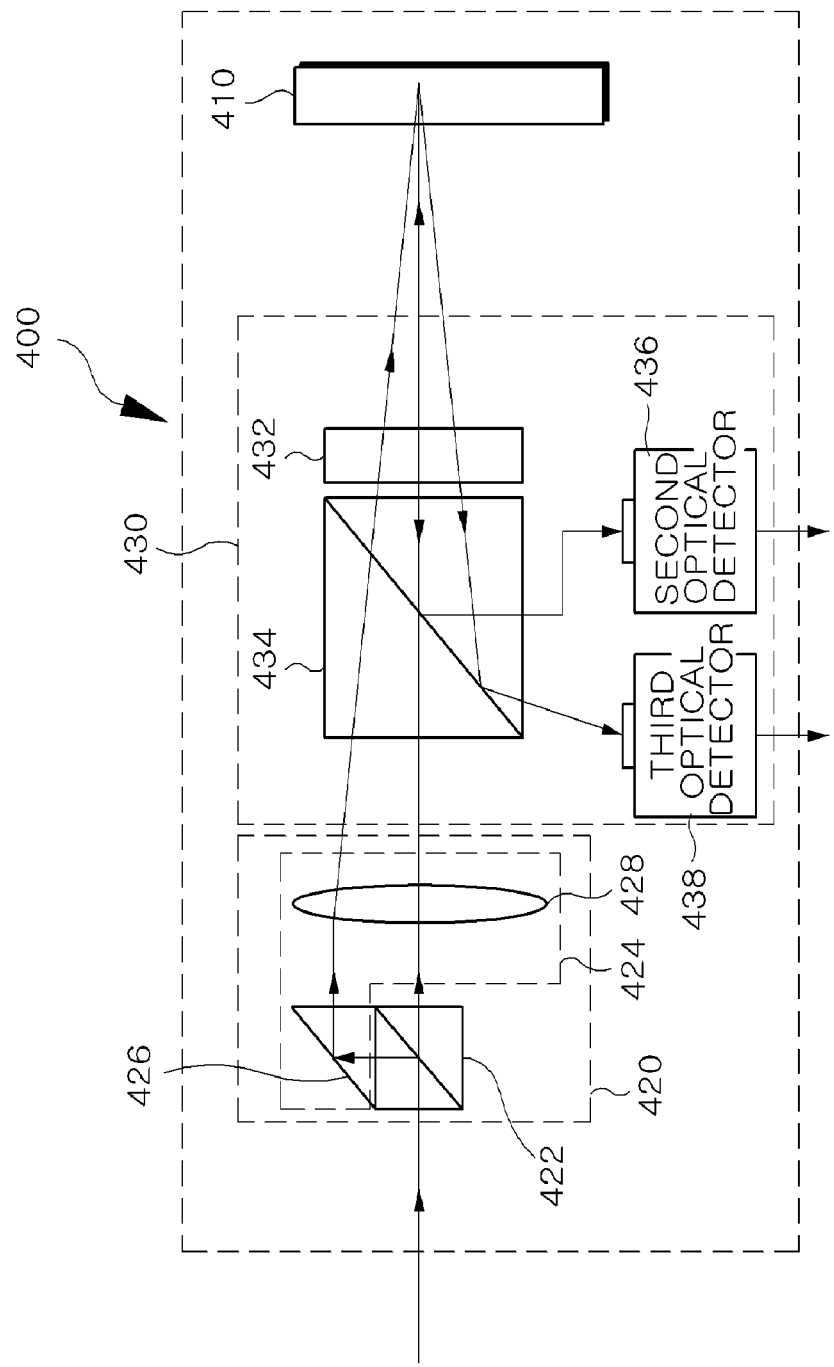
FIG. 4 shows an interference signal generator for use in the shape measurement apparatus according to the present invention.
Figure 5:
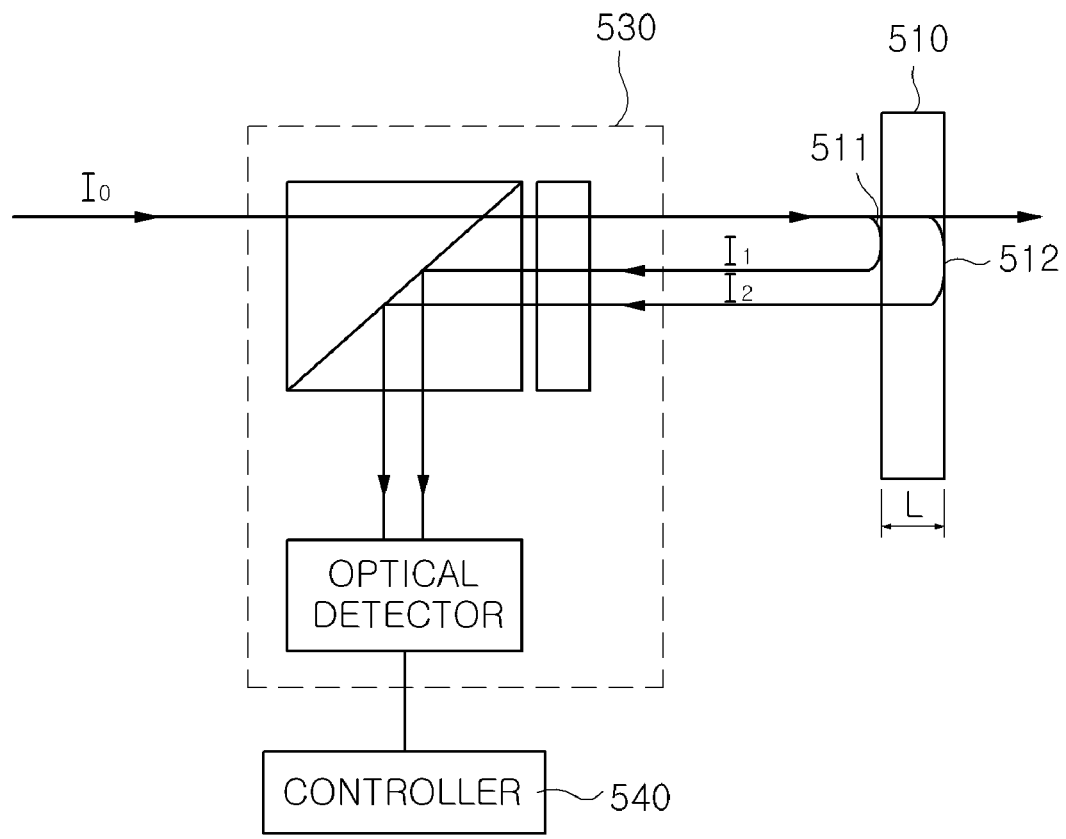
FIG. 5 is a conceptual diagram illustrating a wavelength measurement principle of the shape measurement apparatus according to the present invention.

FIG. 4 shows an interference signal generator for use in the shape measurement apparatus according to the present invention. FIG. 5 is a conceptual diagram illustrating a wavelength measurement principle of the shape measurement apparatus according to the present invention.

Referring to FIGS. 4 and 5, the interference signal generator 400 generates an interference signal for detecting a wavelength of the beam emitted from the semiconductor laser 210. For this operation, the interference signal generator 400 includes a sample substrate 410, an optical illumination means 420, and an optical detection means 430.

The sample substrate 410 has a predetermined thickness. For example, the sample substrate 410 may be a glass substrate. If a thickness (L) of a sample substrate 510 has been pre-recognized, interference of the beam reflected from the sample substrate 510 is analyzed, such that a wavelength of a beam ($I_0$) incident on the sample substrate 510 can be detected. There arises interference between one beam $I_1$ reflected from the front side 511 of the sample substrate 510 and the other beam $I_2$ reflected from the back side. Due to this interference, the intensity of the beam detected by the optical detection means 530 periodically varies with time. The controller 540 analyzes the beam intensity, and calculates a wavelength of the beam emitted from the semiconductor laser 210, such that it can recognize a variation caused by the interference phenomenon. The interference signal generator 400 allows the beam emitted from the semiconductor laser 210 to be incident on the sample substrate 410, causes the interference phenomenon to occur in the beam reflected from the sample substrate 410, and generates an interference signal, such that the generated interference signal is outputted to the controller 120.

The optical illumination means 420 applies the beam emitted from the semiconductor laser 210 to the sample substrate. For this operation, the optical illumination means 420 includes a beam splitter 422 and an optical path adjusting unit 424. The beam splitter 422 divides the beam emitted from the semiconductor laser 210 into a first beam and a second beam. The optical path adjusting unit 424 allows the first beam and the second beam generated from the beam splitter 422 to have different incident angles, such that the first beam and the second beam are incident on the sample substrate 410 at different incident angles. For this operation, the optical path adjusting unit 424 includes a focus lens 428 and a reflection mirror 426. The reflection mirror 426 reflects the beam received from the beam splitter 422, and illuminates the reflected beam on the focus lens 428. The focus lens 428 refracts individual incident beams, such that the individual incident beams are incident on the sample substrate 410 at different incident angles.

In accordance with another embodiment of the present invention, the optical illumination means 420 controls the beam emitted from the semiconductor laser 210 to be incident on the sample substrate 410 without dividing the beam emitted from the semiconductor laser 210 into several beams.

The optical detection means 430 detects the beam reflected from the sample substrate 410. For this operation, the optical detection means 430 includes a quarter-wave plate 432, a polarization beam splitter 434, a second optical detector 436, and a third optical detector 438. The quarter-wave plate 432 adjusts polarization of the first and second beams reflected from the sample substrate 410, such that the polarized beams are generated from the quarter-wave plate 432. The polarization beam splitter 434 reflects the first and second beams having adjusted polarizations, such that the reflected first and second beams are reflected on the second and third optical detectors, respectively. Namely, the polarization beam splitter 434 passes the first and second beams received from the beam splitter 422, and reflects the polarization-adjusted first and second beams, such that it lies halfway between an intermediate part of the beam splitter 422 and the sample substrate 410. The second optical detector 436 and the third optical detector 438 detect the first beam and the second beam reflected from the polarization beam splitter 434, respectively.

Figure 6:
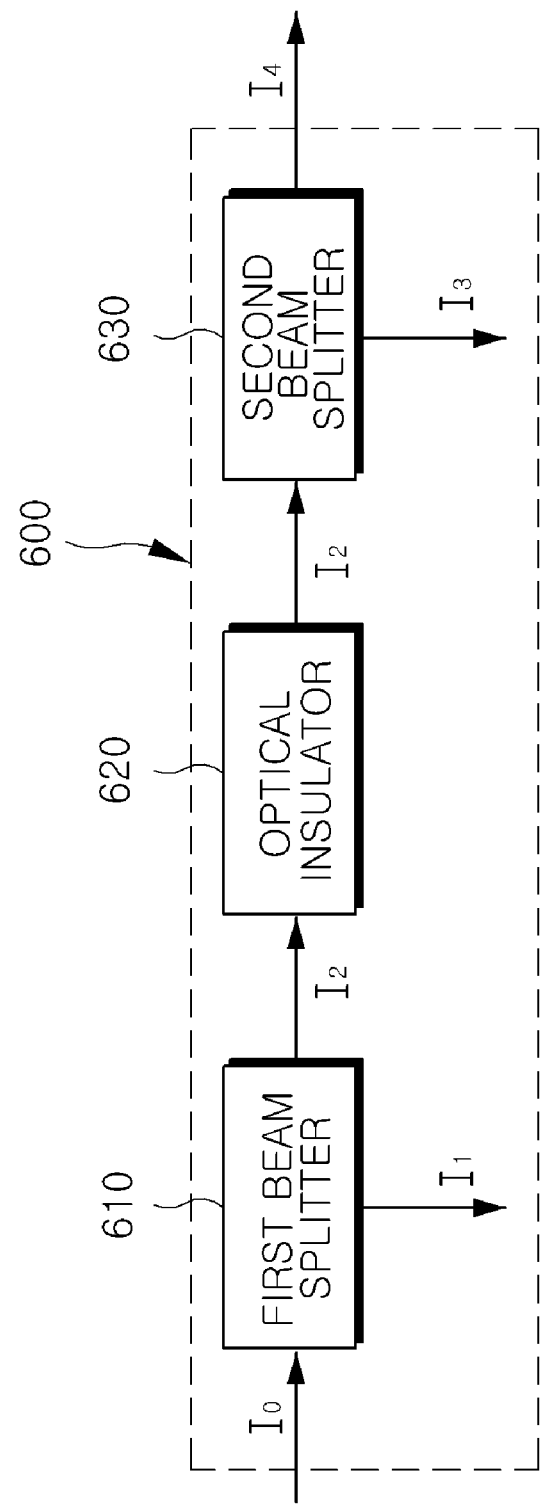
FIG. 6 is a block diagram illustrating an optical transmission unit for use in the shape measurement apparatus according to the present invention.

FIG. 6 is a block diagram illustrating an optical transmission unit for use in the shape measurement apparatus according to the present invention.

Referring to FIG. 6, the optical transmission unit 240 splits the beam emitted from the semiconductor laser 210 into several beams, such that the resultant beams are illuminated on the external reflector 220 and the interference signal generator 230. For this operation, the optical transmission unit 600 includes a first beam splitter 610, an optical insulator 620, a second beam splitter 630. The first beam splitter 610 splits the beam $I_0$ emitted from the semiconductor laser 210 into a plurality of beams, such that some parts $I_1$ of the resultant beams are illuminated on the external reflector 220. The optical insulator 620 allows the remaining parts $I_2$, i.e., the beam not illuminated on the external reflector 220, to pass through the second beam splitter 630. In this case, the optical insulator 620 maintains the intensity of the beam $I_2$, and prevents reverse reflection of the beam $I_2$. The second beam splitter 630 splits the beam $I_2$ received from the optical insulator 620 into a plurality of split beams, some parts $I_3$ of the split beams are illuminated on the interference signal generator, and the remaining parts $I_4$ are emitted to the outside. In this case, the beam $I_4$ is emitted to the outside if the generated beam has a specific frequency. In more detail, if a frequency of the beam generated from the semiconductor laser 210 is equal to a resonance frequency of the external reflector 220, the beam $I_4$ is emitted to the outside.

Figure 7:
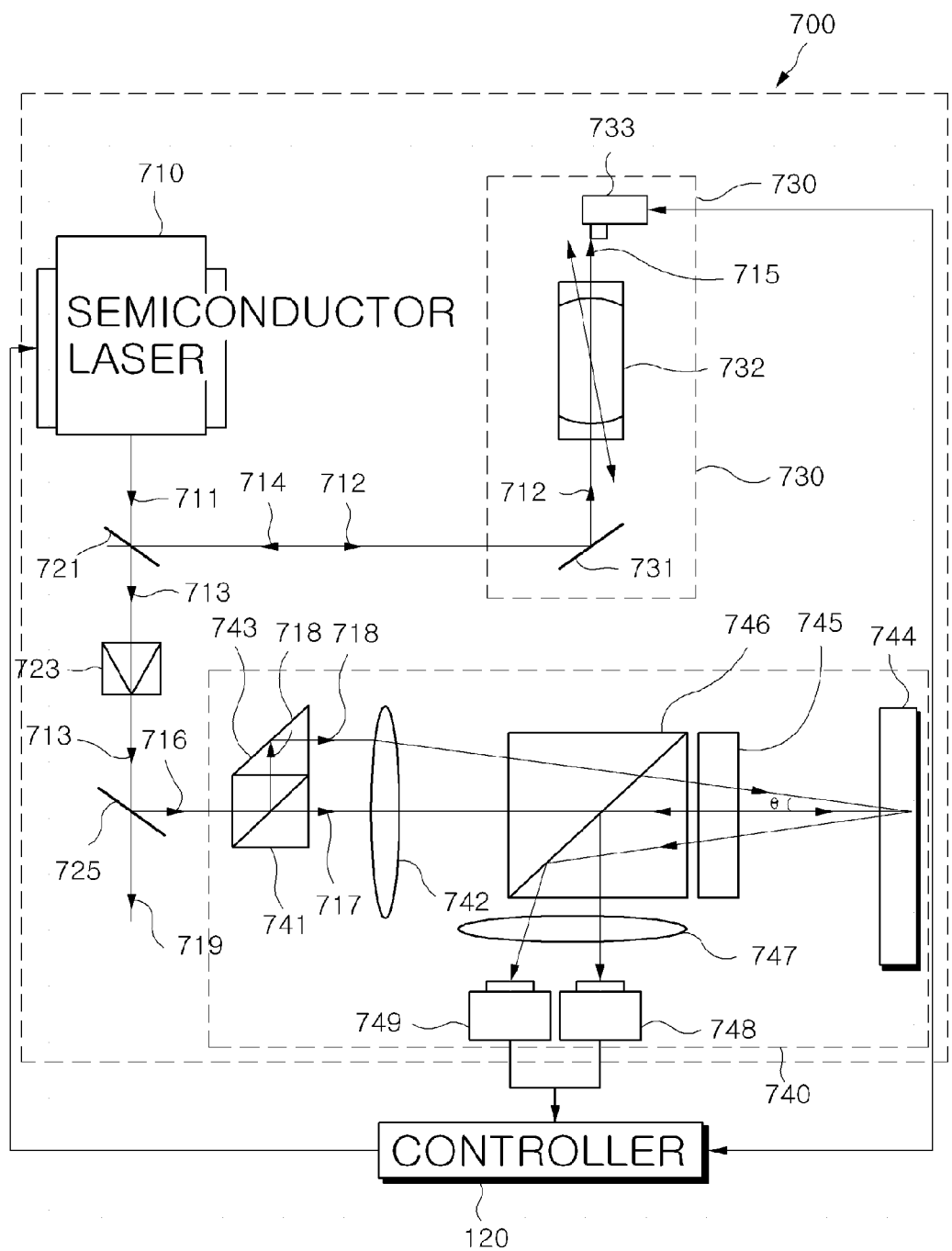
FIG. 7 is a structural diagram illustrating a laser device for use in the shape measurement apparatus according to the present invention.

FIG. 7 is a structural diagram illustrating a laser device for use in the shape measurement apparatus according to the present invention.

Referring to FIG. 7, the beam 711 emitted from the semiconductor laser 710 is split into a first beam 712 and a second beam 713 by a first beam splitter 721. The first beam 712 is illuminated on an external reflector 730, and is then applied to an optical resonator 732 by a first means 731. If the first beam 712 is resonated by the optical resonator 732, a beam 714 emitted from the optical resonator 732 is fed back to the semiconductor laser 710. The beam 715 from the optical resonator 732 is detected by a first optical detector 733. The controller 120 detects a resonance frequency from the detected beam 715.

The second beam 713 passes through the optical insulator 723, such that the resultant beam 713 is illuminated on the second beam splitter 725. The second beam 713 illuminated on the second beam splitter 725 is split into a third beam 716 and a fourth beam 719. The third beam 716 is illuminated on the interference signal generator 740, and the fourth beam 719 is emitted to the outside. The third beam 716 illuminated on the interference signal generator 740 is split into a fifth beam 717 and a sixth beam 718 by the beam splitter 741. The fifth beam 717 from the beam splitter 741 passes through the focus lens 742 such that it is incident on the sample substrate 744. In this case, the incident angle of the fifth beam 717 is 0° (i.e., vertical incidence). The sixth beam 718 generated from the beam splitter 741 is reflected from the reflection mirror 743, and the reflected sixth beam 718 passes through the focus lens 742 and is then incident on the sample substrate 744. In this case, a difference θ in incident angle between the fifth beam 717 and the sixth beam 718 has a predetermined value at which a phase difference between the beam detected from the second optical detector 748 and the other beam detected from the third optical detector 749 is 90°. In other words, in order to implement the phase difference of 90° between the beam detected from the second optical detector 748 and the other beam detected from the third optical detector 749, an optical path of the sixth beam 718 is adjusted by the reflection mirror 743 and the focus lens 742. Some parts of the fifth beam 717 and the sixth beam 718 are reflected from the front side of the sample substrate 744, and the remaining parts are reflected from the back side of the sample substrate 744, such that the resulting beams are incident on the quarter-wave plate 745. Polarization of the fifth and sixth beams 717 and 718 incident on the quarter-wave plate 745 is adjusted. The polarization-adjusted result is incident on the polarization beam splitter 746 and is then reflected by the polarization beam splitter 746, such that the reflected result is illuminated on the focus lens 747. Each of the fifth and sixth beams 717 and 718 illuminated on the focus lens 747 is collimated, such that the collimated beams 717 and 718 are detected by the second optical detector 748 and the third optical detector 749, respectively.

The controller 120 calculates a wavelength of the beam 711 emitted from the semiconductor laser 710 on the basis of the interference signals generated by the fifth and sixth beams 717 and 718. The controller 120 more precisely calculates the wavelength of the beam 711 emitted from the semiconductor laser 710 using a resonance frequency detected from the beam 715 detected by the first optical detector 733. The controller 120 adjusts a temperature of the semiconductor laser 710 and a current signal applied to the semiconductor laser 710 on the basis of the calculated wavelength, such that it controls the semiconductor laser 710 to emit the beam of a stable frequency.

Figure 8:
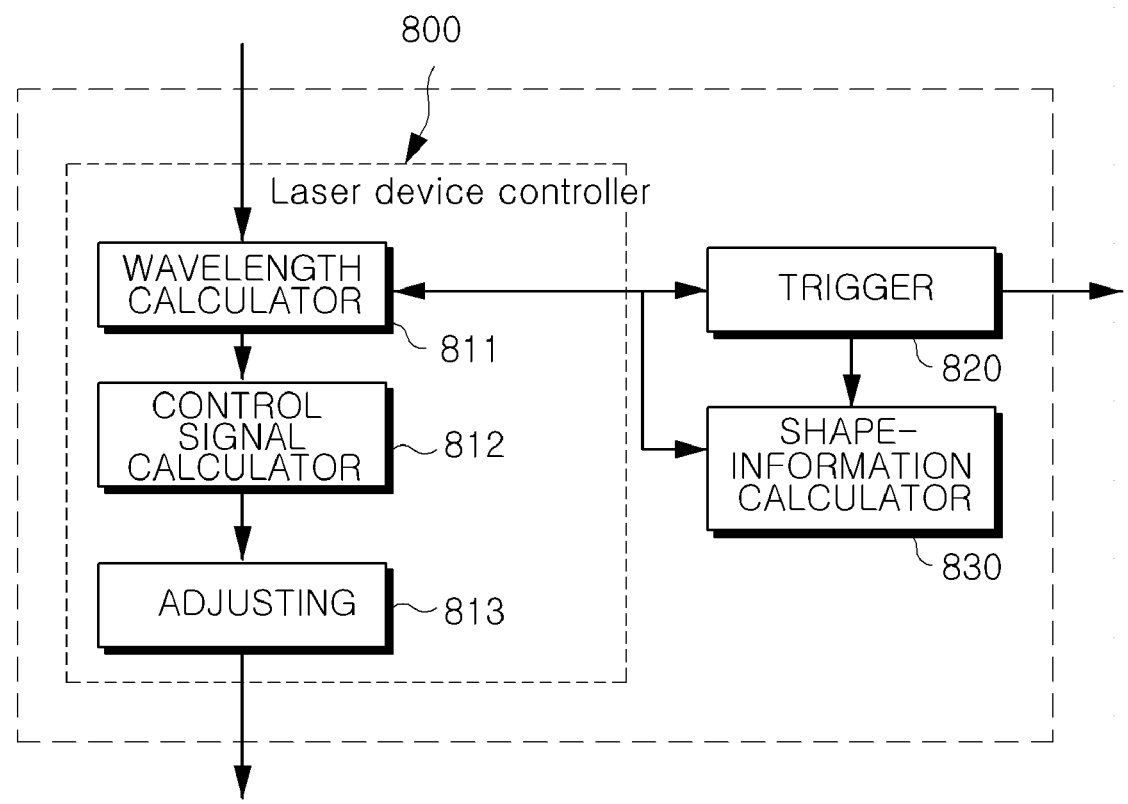
FIG. 8 is a block diagram illustrating a controller for use in the shape measurement apparatus according to the present invention.

FIG. 8 is a block diagram illustrating the controller for use in the shape measurement apparatus according to the present invention.

Referring to FIG. 8, the controller 120 detects a wavelength of the beam generated from the interference signals outputted from the laser devices 111 and 116, and controls the laser devices 111 and 116 on the basis of the detected wavelength. For this operation, the controller 800 includes a laser-device controller 810, a trigger 820, and a shape-information calculator 830.

The laser-device controller 810 detects a wavelength of the beam emitted from the semiconductor laser 210 on the basis of the interference signal generated by the interference signal generator 230, detects a resonance frequency from the beam detected from the external reflector 220, and adjusts a temperature of the semiconductor laser 210 and a current signal applied to the semiconductor laser 210, such that it controls the semiconductor laser 210. For this operation, the laser-device controller 810 includes a wavelength calculator 811, a control signal calculator 812, and an adjusting unit 813.

The wavelength calculator 811 detects a wavelength from the interference signal generated from the interference signal generator 230. In other words, the wavelength calculator 811 analyzes the interference pattern generated by the first and second beams respectively detected by the second and third optical detectors 436 and 438, such that it detects the wavelength of the beam emitted from the semiconductor laser 210.

The wavelength calculator 811 calculates wavelengths (λ) of the beams detected by the second and third optical detectors 436 and 438 using the following equation 1:

$$I_{pd2} = I_1 + I_2 + 2\sqrt{I_1 I_2} \cos\left(\frac{4\pi nL}{\lambda}\right) \quad \text{[Equation 1]}$$

In Equation 1, I is the intensity of individual beams detected by the optical detectors 436 and 438, $I_1$ is the intensity of the beam, which is detected by the optical detector 436 after being reflected from the front side of each sample substrate 410, $I_2$ is the intensity of the other beam, which is detected by the optical detector 438 after being reflected from the back side of each sample substrate 410, n is a refractive index of the sample substrate, and L is a thickness of the sample substrate.

If the optical path adjusting unit 424 adjusts incident angles of the first and second beams from the beam splitter 422 to the sample substrate 410 in order to implement a phase difference of 90° between the first beam detected by the optical detector 436 and the second beam detected by the optical detector 438, the intensity $I_{pd2}$ of the beam detected by the second optical detector 436 can be represented by the following equation 2:

$$I_{pd2} = I_1 + I_2 + 2\sqrt{I_1 I_2} \cos\left(\frac{4\pi nL}{\lambda}\right) \quad \text{[Equation 2]}$$

In this case, if the incidence angles of the first and second beams incident on the sample substrate are adjusted to implement a phase difference of 90° between the first beam detected by the optical detector 436 and the second beam detected by the optical detector 438, the intensity $I_{pd3}$ of the beam detected by the third optical detector 438 can be represented by the following equation 3:

$$I_{pd3} = I_1 + I_2 + 2\sqrt{I_1 I_2} \sin\left(\frac{4\pi nL}{\lambda}\right) \quad \text{[Equation 3]}$$

The wavelength calculator 811 can calculate a wavelength of the beam emitted from the semiconductor laser 210 using the second and third equations 2 and 3.

Figure 9:
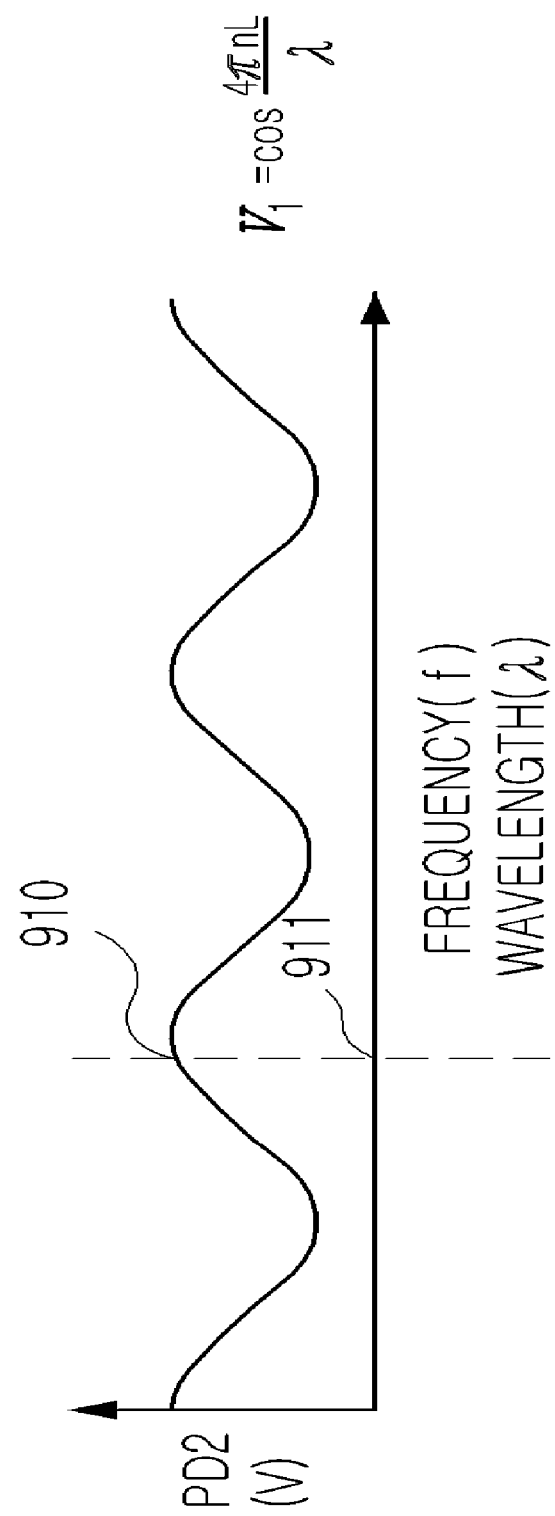
FIG. 9 is a graph illustrating the intensity for each frequency of the beam detected by a second detector for use in the shape measurement apparatus according to the present invention.
Figure 10:
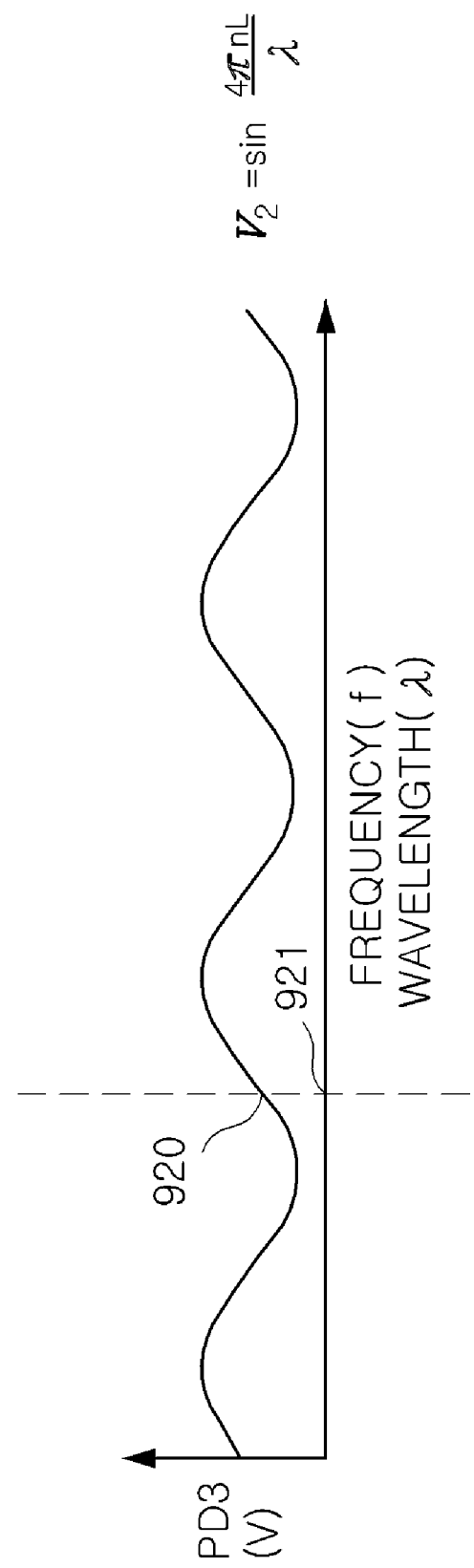
FIG. 10 is a graph illustrating the intensity for each frequency of the beam detected by a third detector for use in the shape measurement apparatus according to the present invention.
Figure 11:
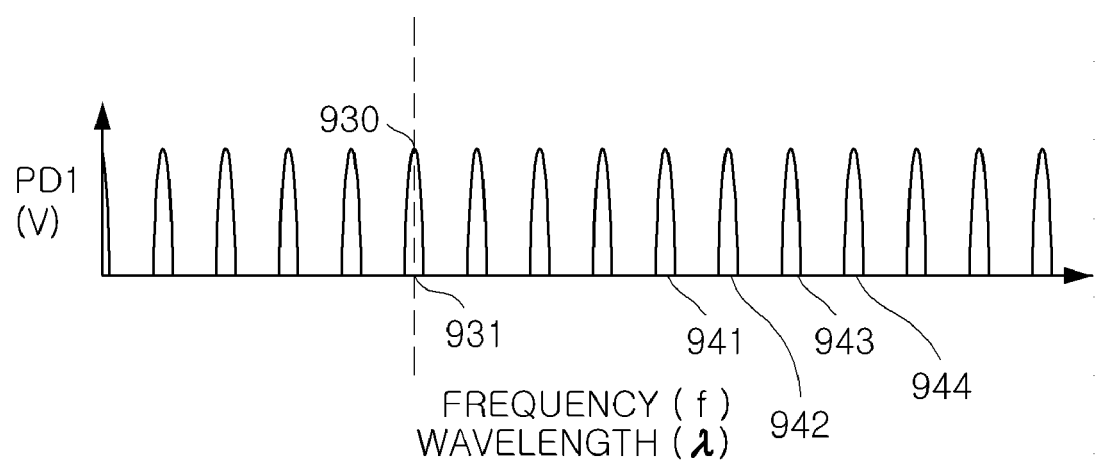
FIG. 11 is a graph illustrating the intensity for each frequency of the beam detected by a first detector for use in the shape measurement apparatus according to the present invention.
Figure 12:
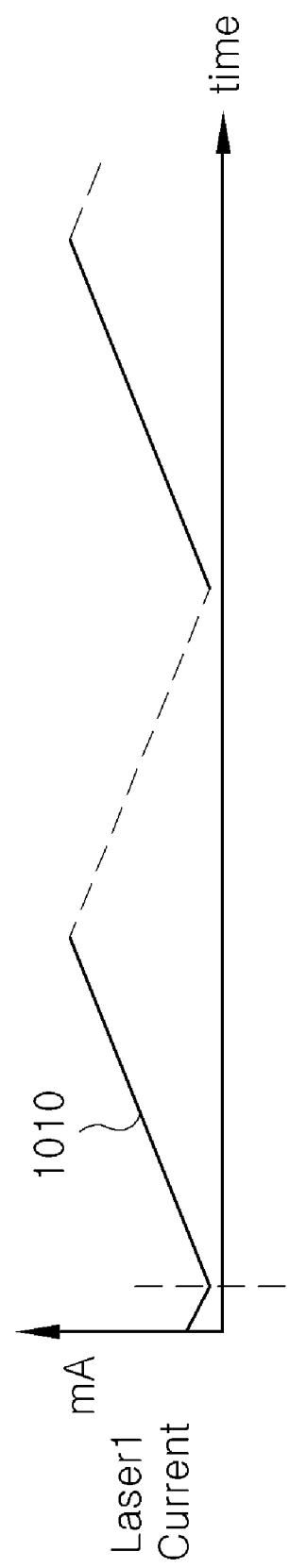
FIGS. 12 to 16 show a current signal applied to one laser device of the shape measurement apparatus, a beam generated from a current signal detected by a first optical detector, opening and closing states of a corresponding shutter, a trigger operation based on a resonance frequency detected from the beam generated by the current signal, and other beams generated by the laser device having received the current signal, respectively, according to the present invention.
Figure 13:
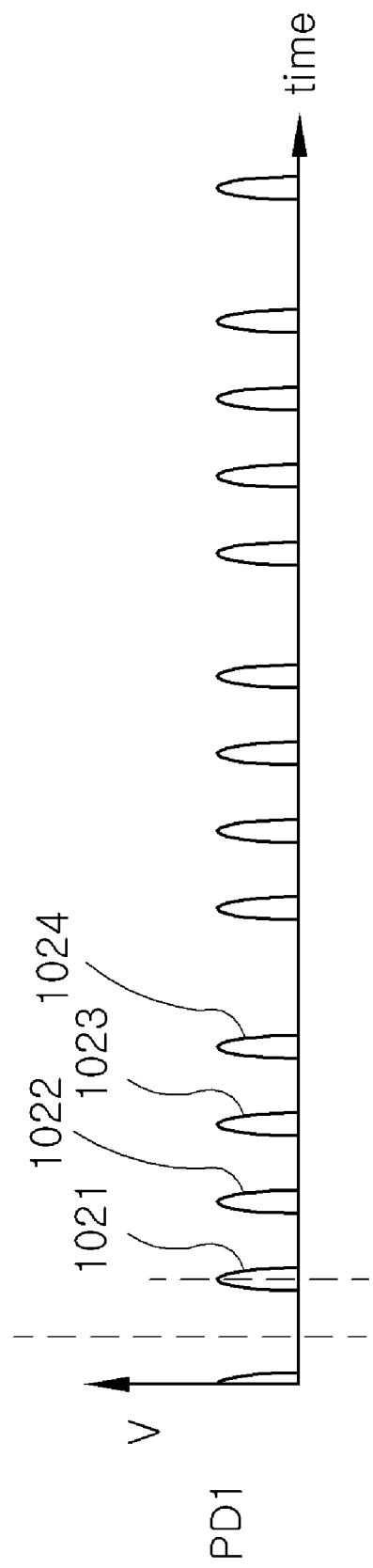
Figure 14:
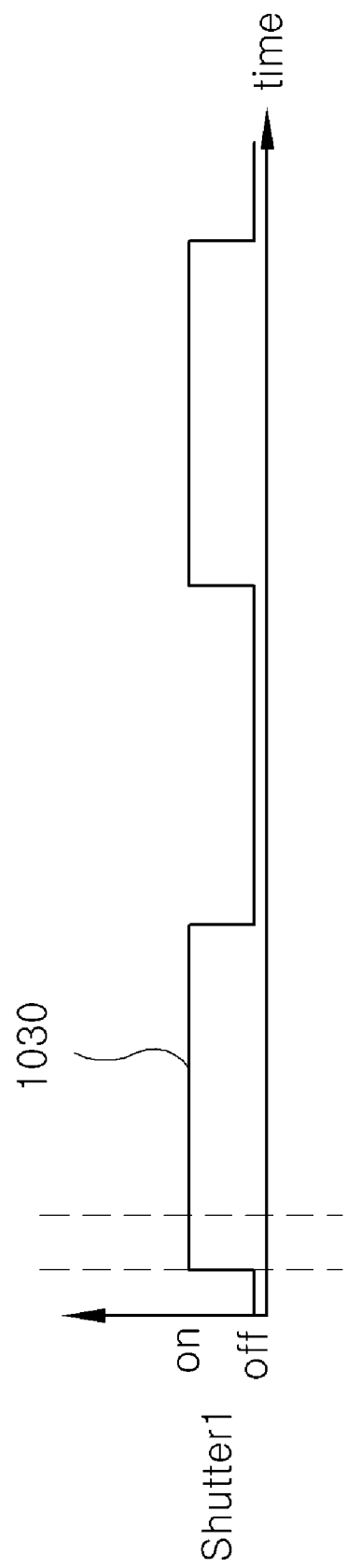
Figure 15:
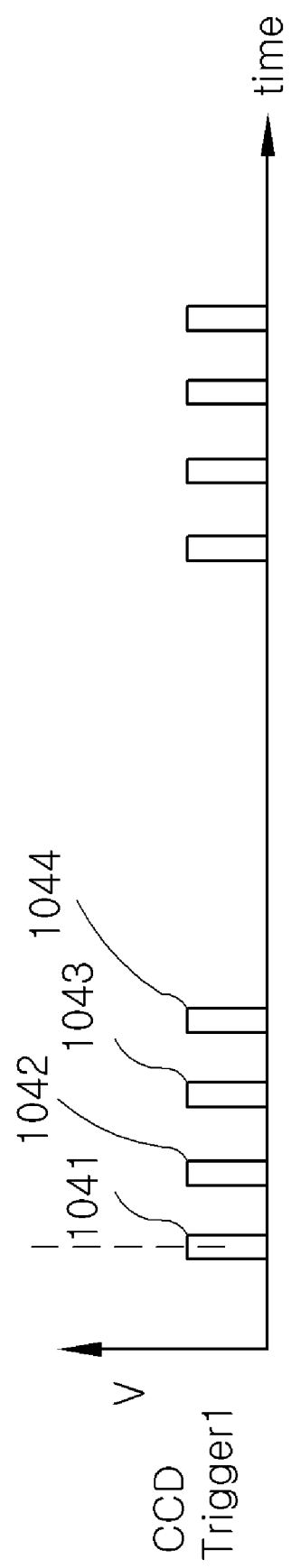
Figure 16:
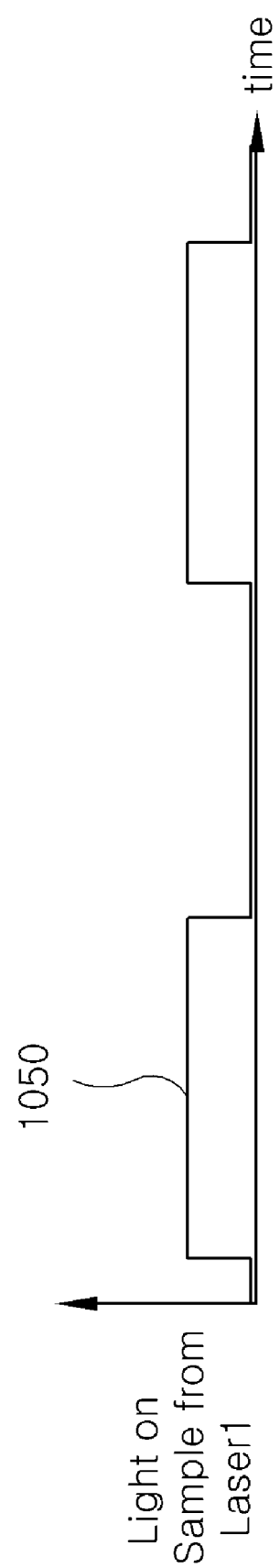
Figure 17:
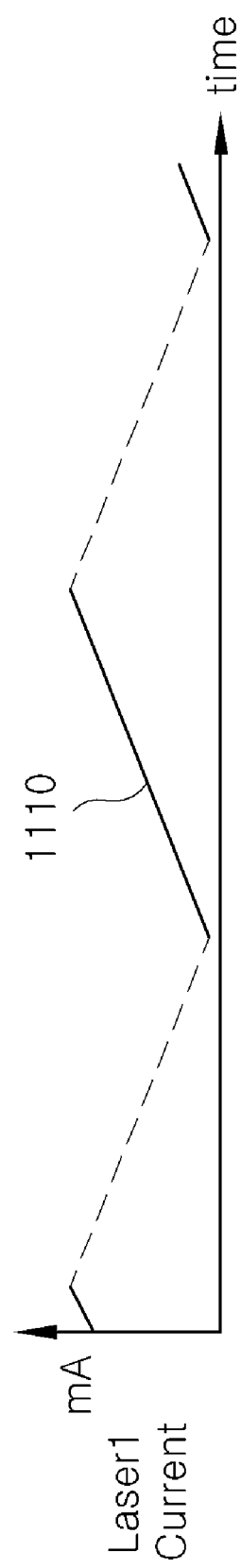
FIGS. 17 to 21 show a current signal applied to the other laser device of the shape measurement apparatus, a beam generated from a current signal detected by a first optical detector, opening and closing states of a corresponding shutter, a trigger operation based on a resonance frequency detected from the beam generated by the current signal, and other beams generated by the laser device having received the current signal, respectively, according to the present invention.
Figure 18:
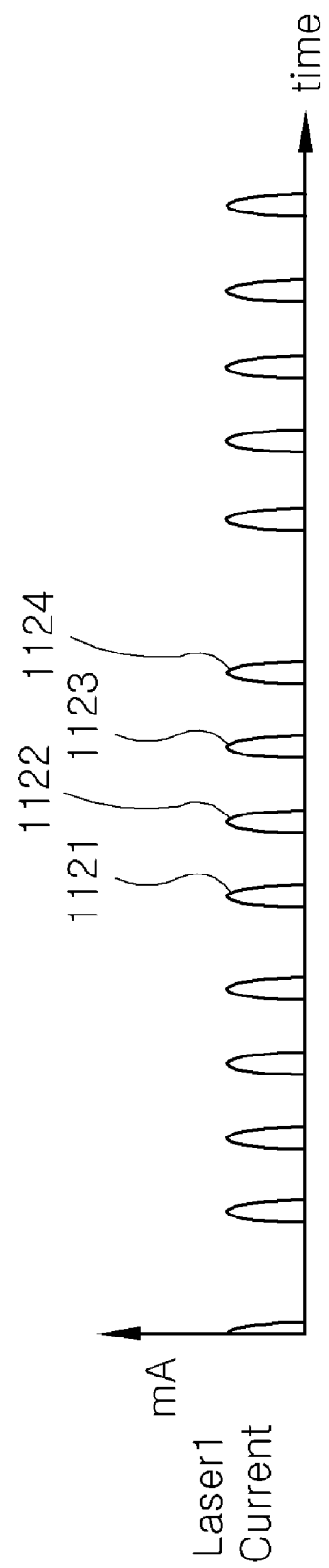
Figure 19:
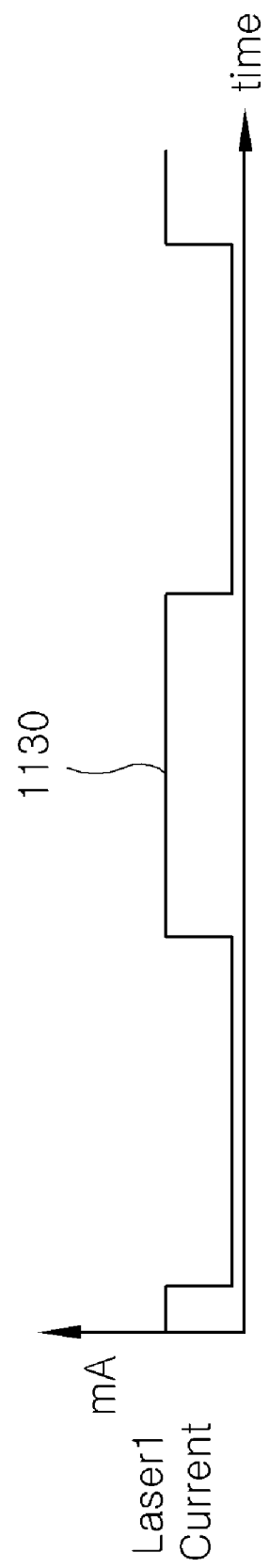
Figure 20:
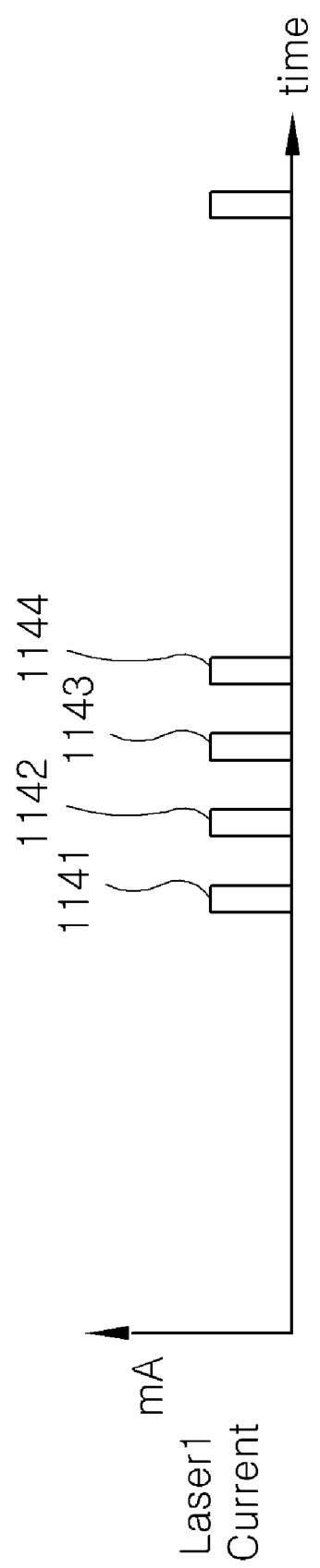
Figure 21:
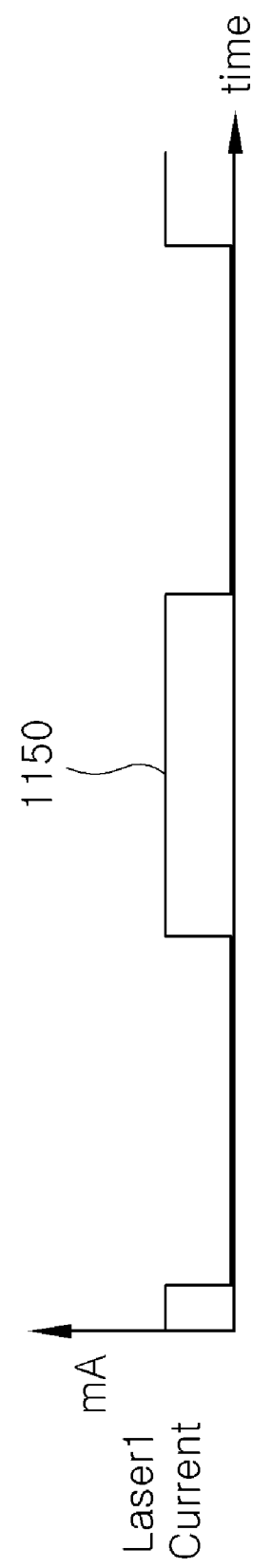

FIG. 9 is a graph illustrating the intensity for each frequency of the beam detected by a second detector for use in the shape measurement apparatus according to the present invention. FIG. 10 is a graph illustrating the intensity for each frequency of the beam detected by a third detector for use in the shape measurement apparatus according to the present invention. FIG. 11 is a graph illustrating the intensity for each frequency of the beam of a first detector for use in the shape measurement apparatus according to the present invention.

Referring to FIGS. 9 to 11, the wavelength calculator 811 detects a resonance frequency from the beam detected by the external reflector 220. If the time detected by the resonance frequency is set to 't' and the intensity of the beam detected by the second optical detector 436 is $A_1$ 910, the wavelength calculator 811 calculates a wavelength $\lambda_1$ 911. In this way, if the time is 't' and the intensity of the beam detected by the third optical detector 438 is $A_2$ 920, the wavelength calculator 811 calculates a wavelength $\lambda_2$ 921. If the time is 't' and the wavelength calculator 811 detects a resonance frequency, a wavelength $\lambda_0$ 931 can be calculated by the following equation 4. In this case, the wavelength calculator 811 detects a frequency of the beam detected by the external reflector 220 at a specific position 930 where the intensity of the beam detected by the external reflector 220 reaches a maximum value, and this detected frequency is used as a resonance frequency. In this way, if the resonance frequency is detected, the wavelength calculator 811 adds a wavelength $\lambda_0$ to each of the wavelengths $\lambda_1$ and $\lambda_2$ to implement a higher resolution, such that it correctly and precisely detects the wavelength of the beam emitted from the semiconductor laser 210. Therefore, the shape measurement apparatus according to the present invention can correctly calculate a wavelength of the beam emitted from the semiconductor laser 210 at a high resolution and a resonance frequency.

$$C = f \times \lambda \quad \text{[Equation 4]}$$

In Equation 4, C is a light speed, f is a resonance frequency, and $\lambda$ is a wavelength.

The control signal calculator 812 calculates a control signal on the basis of the detected wavelength. The control signal calculator 812 may calculate a control signal capable of calculating a specific-area wavelength upon receiving a command from the trigger 820. In more detail, upon receiving a request of raising a wavelength area from the trigger 820, the control signal calculator 812 calculates a variation value of a current signal applied to the semiconductor laser 210 and a temperature variation value of the semiconductor laser 210 as control signals.

Also, the control signal calculator 812 calculates a control signal for fixing both the temperature of the semiconductor laser 210 and the current signal applied to the semiconductor laser 210, such that the locking status of the frequency of the beam emitted from the semiconductor laser 210 is maintained at the resonance frequency detected by the wavelength calculator 811. In this case, the control signal calculator 812 may separately calculate individual control signals for adjusting the temperature and the current signal, or may simultaneously consider the individual control signals for adjusting the temperature and the current signal.

The adjusting unit 813 adjusts either the temperature of the semiconductor laser 210 or the current signal applied to the semiconductor laser 210 according to a control signal calculated by the control signal calculator 812. A wavelength area of the beam emitted from the semiconductor laser 210 is changed according to the temperature or current signal adjusted by the adjusting unit 813.

As a result, the laser-device controller 810 changes or fixes the temperature of the semiconductor laser 210 or the current signal applied to the semiconductor laser 210, such that it controls the semiconductor laser 210 to emit the beam having stable frequencies 941, 942, 943, and 944 for a long period of time.

Therefore, the shape measurement apparatus 100 according to the present invention generates stable-frequency beams of individual frequency areas for a long period of time, such that it measures the shape of the object 101. Also, the measurement apparatus 100 correctly and precisely calculate a wavelength of the generated beam at a high resolution, such that it uses the calculated wavelength to measure the shape of the object.

The trigger 820 allows the laser devices 111 and 116 to be alternately driven. Preferably, the trigger 820 controls the laser device 111 to emit the beam having four specific frequencies, and then controls the laser device 116 to be driven. If the trigger 820 opens the shutter 131 for preventing the beam emitted from the driven laser device 111 from among several shutters 131 and 136, controls the beam emitted from the driven laser device 111 to be incident on the optical unit 140, and drives the other laser device 116, the trigger 820 prevents the beam emitted from the laser device 111 by closing the shutter 131, and opens the shutter 136 in order to allow the beam emitted from the laser device 116 to be incident on the optical unit 140.

The trigger 820 synchronously detects the interference pattern captured by the image pickup unit 150 according to a detection time of the resonance frequency detected by the wavelength calculator 811, acquires the captured interference pattern with respect to each specific-frequency beam, and outputs the acquired interference pattern to the shape-information calculator 830. If the trigger 820 acquires the captured interference pattern for the specific-frequency beam, it commands the control signal calculator 812 to adjust the temperature of the semiconductor laser 210 or the current signal applied to the semiconductor laser 210.

The shape-information calculator 830 calculates shape information of the target object 101 on the basis of a specific frequency of the beam emitted from the laser devices 111 and 116 and each specific-frequency beam. In this case, the shape information of the target object 101 indicates three-dimensional (3D) shape dimensions, e.g., a surface height and a surface roughness.

The optical unit 140 projects the beams emitted from the laser devices 111 and 116 on the target object 101, such that it forms an interference pattern of the target object 101. That is, the optical unit 140 splits the beams emitted from the laser devices 111 and 116, illuminates some parts of the split beams on the target object 101, uses the remaining parts of the split beams as a reference beam, and encounters interference between one beam reflected from the object 101 and the reference beam, such that it generates the interference pattern.

The shutter 131 or 136 is open or closed by a control signal of the controller 120. If the shutter is closed, the beam emitted from the laser device 111 or 116 is not illuminated on the optical unit 140. If the shutter is open, the blocked beam passes through the optical unit 140. There are a plurality of shutters 131 and 136, and it is preferable that one shutter is allocated to each laser device 111 or 116. In this case, each shutter 131 or 136 prevents the beam emitted from the corresponding laser device 111 or 116.

The image pickup unit 150 captures the interference pattern generated by the optical unit 140. For example, the image pickup unit 150 may be implemented with a digital camera. A solid status pickup unit, e.g., a charged coupled device (CCD) or a complementary metal oxide semiconductor (CMOS), may be used as a pickup element of the image pickup unit 150. The image pickup unit 150 captures the interference pattern generated by each specific-frequency beam from among the beams emitted from the laser devices 111 and 116 upon receiving a control signal from the controller 120.

FIGS. 12 to 16 show a current signal applied to one laser device of the shape measurement apparatus, a beam generated from a current signal detected by a first optical detector, opening and closing states of a corresponding shutter, a trigger operation based on a resonance frequency detected from the beam generated by the current signal, and other beams generated by the laser device having received the current signal, respectively, according to the present invention. FIGS. 17 to 21 show a current signal applied to the other laser device of the shape measurement apparatus, a beam generated from a current signal detected by a first optical detector, opening and closing states of a corresponding shutter, a trigger operation based on a resonance frequency detected from the beam generated by the current signal, and other beams generated by the laser device having received the current signal, respectively, according to the present invention.

Referring to FIGS. 12 to 21, the controller 120 applies the current signals 1010 and 1110 to the laser devices 111 and 116 by turns. The controller 120 applies the current signal to the laser device 111 and at the same time opens the shutter 131 at a period 1030, the beam 1050 is illuminated on the object 101. In this case, the laser device 111 emits specific-frequency beams 1021, 1022, 1023, and 1024. In this case, the controller 120 confirms the emission of the specific-frequency beams 1021, 1022, 1023, and 1024, generates trigger signals 1041, 1042, 1043, and 1044 according to the emission of specific-frequency beams, acquires the interference pattern captured by the image pickup unit 150 according to the generated trigger signals 1041, 1042, 1043, and 1044, and adjusts the current signals applied to the laser devices 111 and 116.

In this way, if the controller 120 applies the current signal to the laser device 116, and at the same time opens the shutter 136, the beam 1150 is illuminated on the object 101. In this case, the laser device 116 emits the specific-frequency beams 1121, 1122, 1123, and 1124. In this case, the controller 120 confirms the emission of the specific-frequency beams 1121, 1122, 1123, and 1124, generates trigger signals 1141, 1142, 1143, and 1144 according to the emission of specific-frequency beams, acquires the interference pattern captured by the image pickup unit 150 according to the generated trigger signals 1141, 1142, 1143, and 1144, and adjusts the current signals applied to the laser devices 111 and 116.

Figure 22:
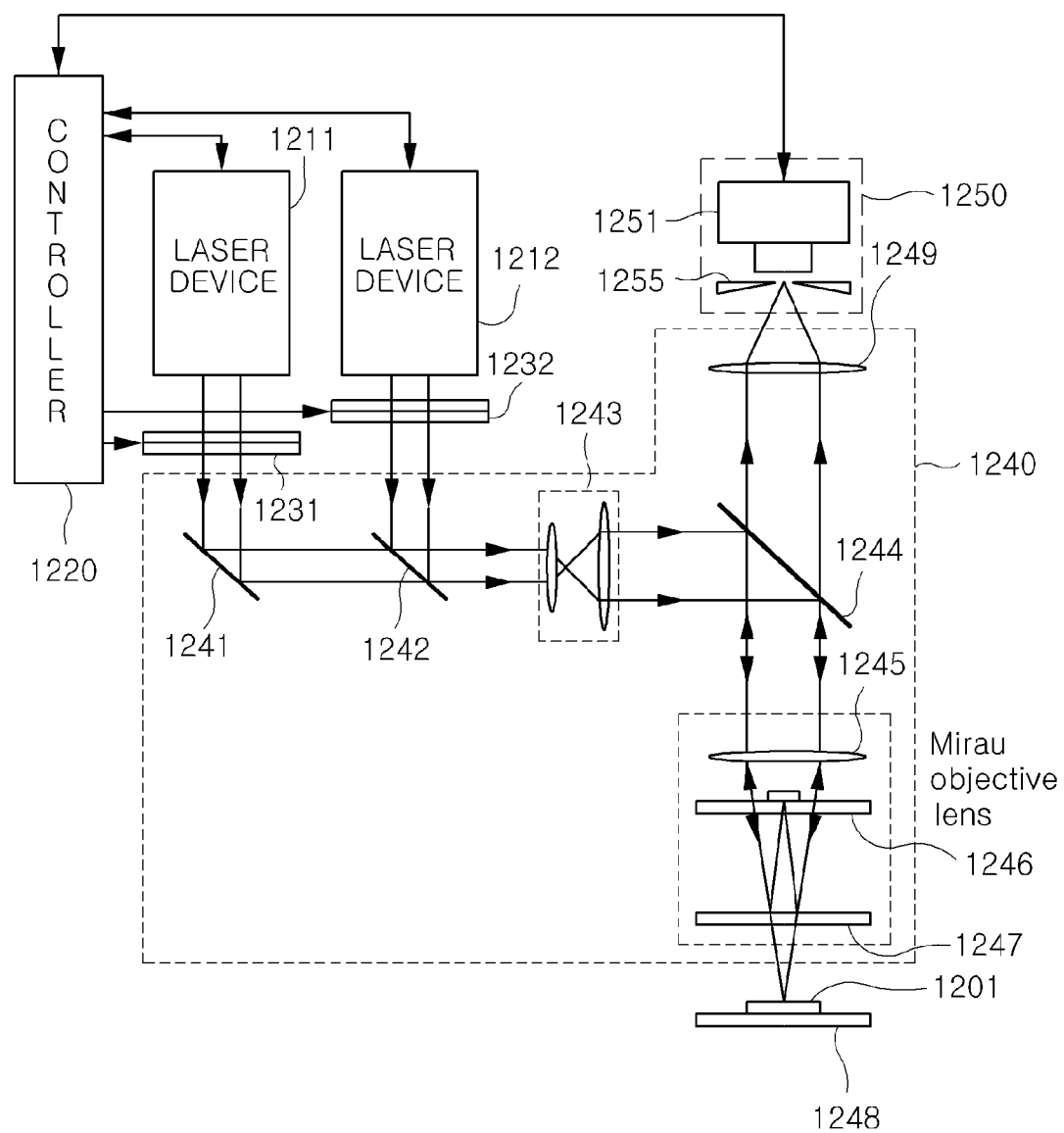
FIG. 22 is a block diagram illustrating a shape measurement apparatus according to the present invention.

FIG. 22 is a block diagram illustrating a shape measurement apparatus according to the present invention.

Referring to FIG. 22, the controller 1220 applies the current signal to the laser device 1211, and opens the shutter 1231. The beam emitted from the laser device 1211 passes through the shutter 1231, and is then illuminated on the optical device 1240. The beam illuminated on the optical unit 1240 is reflected from the reflection mirror 1241, such that the reflected beam is illuminated on a collimating lens (CL) 1243. The collimating lens 1243 allows the illuminated beam to be collimated, such that the collimated beam is incident on the beam splitter 1244. The beam incident on the beam splitter 1244 is incident on the objective lens 1245. The beam incident on the objective lens 1245 is illuminated on a reference mirror 1246. The beam illuminated on the reference mirror 1246 passes through the reference mirror 1246, and is then incident on the beam splitter 1247. Some parts of the beam incident on the beam splitter 1247 are reflected from the beam splitter 1247, and are then illuminated on the reference mirror 1246. The remaining parts of the above beam is projected on the object 1201 located on a measurement table 1248.

The beam illuminated on the reference mirror 1246 is reflected from the reference mirror 1246, and is re-illuminated on the beam splitter 1247. The re-illuminated beam is reflected from the beam splitter 1247, and is applied again to the reference mirror 1246. The beam illuminated on the object 1201 is reflected from the object 1201, is applied again to the reference mirror 1246, and passes through the beam splitter 1247, such that the beam from the beam splitter 1247 is incident on the reference mirror 1246. In this case, interference occurs between the beam applied to the reference mirror 1246 after being reflected from the object 1201 and the other beam re-applied to the reference mirror 1246. The beam applied to the reference mirror 1246 and the other beam re-applied to the reference mirror 1246 pass through the objective lens 1245, and the resulting beams are illuminated on a focusing lens 1249. The beam illuminated on the focusing lens 1249 is incident on the image pickup unit 1250. The beam incident on the image pickup unit 1250 is illuminated on an iris 1255. An incident amount of the beam incident on the iris 1255 is adjusted, and the adjusted beam is incident on the camera 1251, such that the resulting beam is captured by the image pickup unit of the camera 1251.

If the interference pattern is acquired from individual specific-frequency beams emitted from the laser device 1211, the controller 1220 blocks the current signal applied to the laser device 1211, closes the shutter 1231, applies the current signal to the laser device 1212, and opens the shutter 1232. The beam emitted from the laser device 1211 passes through the shutter 1232, and is then illuminated on the optical unit 1240. The beam illuminated on the optical unit 1240 is reflected from the beam splitter 1242, such that the resulting beam is illuminated on the collimating lens (CL) 1243. The beam illuminated on the collimating lens 1243 passes through the same optical path as that of the beam emitted from the laser device 111, and is incident on the camera 1251, such that the resulting beam is captured by the image pickup unit of the camera 1251.

FIG. 23 is a flow chart illustrating a shape measurement method according to the present invention.

Referring to FIG. 23, the controller 120 selects the laser device 111, and applies a current signal to the laser device 111 at step S1300. The controller 120 opens the shutter 131 for blocking the beam emitted from the laser device 111 receiving the current signal at step S1310. The controller 120 allows a specific-frequency beam to be emitted from the laser device 111 at step S1320. In this case, the controller 120 detects a wavelength of the beam generated from the driven laser device 111, adjusts a current signal applied to the laser device 111 on the basis of the detected wavelength, and determines whether a resonance frequency of the generated beam is detected. If the resonance frequency of the generated beam is detected, the laser device 111 emits the generated beam to the specific-frequency beam. The optical unit 140 projects the beam emitted from the laser device 111 on the object 101, such that it forms the interference pattern. If the image pickup unit 150 captures the interference pattern, the controller obtains the captured interference pattern at step S1330.

The controller 120 determines whether the number of acquired interference patterns is equal to a predetermined number at step S1340. If the number of acquired interference patterns is different from the predetermined number at step S1340, the controller 120 re-performs the above step S1320. If the number of acquired interference patterns is equal to the predetermined number, the controller 120 determines whether shape information of the object 101 can be calculated from the interference pattern at step S1350. If it is determined that the shape information of the object 101 cannot be calculated from the interference pattern, the controller 120 closes the open shutter 131 at step S1360. The controller 120 prevents the current signal from being applied to the driven laser device 111 at step S1370. The controller 120 applies the current signal to the other laser device 116 at step S1380. The controller 120 re-performs the above step S1310. If it is determined that the shape information of the object 101 can be calculated from the interference pattern, the controller 120 calculates shape information on the basis of a specific frequency and the interference pattern acquired from each specific-frequency beam at step S1390.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, the shape measurement apparatus and method according to the present invention emits the beam using a plurality of multi-channel frequency scanning laser devices, each of which emits a stable frequency, such that the shape of a high-height object can be correctly and precisely measured. Also, the shape measurement apparatus and method need not shift the location of a reference plane, and prevents the occurrence of unnecessary time consumption and errors caused by the location shifting of the reference plane, such that the shape of the object can be correctly and quickly measured.

What is claimed is:

1. A shape measurement apparatus comprising:
   a plurality of laser devices which generate beams, emit a beam of a specific frequency from among the generated beams, and output interference signals for detecting wavelengths of the generated beams, respectively, the laser devices including two semiconductor lasers for generating the beam;
   an optical unit for allowing the emitted beams to be projected on a surface of a target object to be measured, and generating an interference pattern of the target object;
   a plurality of shutters for allowing the emitted beams to be illuminated on the optical unit or preventing the emitted beams from being illuminated on the optical unit;
   an image pickup unit for capturing an image of the generated interference pattern; and
   a controller for detecting the wavelengths of the generated beams from the outputted interference signals, and controlling the laser devices on the basis of the detected wavelengths and the generated interference pattern,
   wherein the laser device includes an interference signal generator which generates the interference signal for detecting the wavelength of the generated beam, and outputs the generated interference signal, an external reflector which has the specific frequency serving as a resonance frequency, receives the generated beam, and feeds back the received beam to the semiconductor laser when a frequency of the received beam is equal to the resonance frequency, and an optical transmission unit for emitting the generated beam to an external part when the external reflector feeds back the received beam.

2. The apparatus according to claim 1, wherein the controller drives the laser devices by turns.

3. The apparatus according to claim 2, wherein the controller controls the driven laser device to emit four specific-frequency beams.

4. The apparatus according to claim 1, wherein the controller controls the laser devices by adjusting a temperature or each laser device or a current signal applied to each laser device.

5. The apparatus according to claim 1, wherein the controller allows the emitted beams to be illuminated on the optical unit by opening any of the shutters.

6. The apparatus according to claim 1, wherein the controller acquires the captured interference pattern of each beam of the specific frequency.

7. The apparatus according to claim 6, wherein the controller calculates shape information of the target object on the basis of the acquired interference pattern in association with not only the specific frequency but also individual beams of the specific frequency.

8. A method for measuring a shape using a plurality of laser devices comprising:
   a) driving any one of the laser devices;
   b) emitting a plurality of specific-frequency beams from among the driven laser device, allowing each of the emitted specific-frequency beams to be projected on a target object, and acquiring an interference pattern of the target object in association with each of the specific frequency beams; and c) stopping the driven laser device, and driving the other one from among the plurality of laser devices, wherein the acquiring step b) of an interference pattern includes emitting a beam of a specific frequency via the driven laser device, wherein the beam emitting step includes detecting a wavelength of a beam generated by the driven laser device, adjusting a current signal applied to the laser device on the basis of the detected wavelength; and emitting the beam generated by the driven laser device to an external part as the specific-frequency beam when a resonance frequency of the beam is detected, wherein the resonance frequency of the beam is detected when the beam is fed back from an external reflector of the laser device.

9. The method according to claim 8, wherein the driving step a) of any one of the laser devices includes:

applying a current signal to any one of the laser devices; and opening a shutter for blocking the beam emitted from the laser device having received the current signal.

10. The method according to claim 8, wherein the acquiring step b) of the interference pattern includes:

acquiring the interference pattern of the target object by projecting the emitted beam on the target object.

11. The method according to claim 8, wherein the driving step c) of the other one from among the plurality of laser devices includes:

closing a shutter which blocks the beam emitted from the driven laser device;

preventing a current signal from being applied to the driven laser device;

applying a current signal to the other one from among the laser devices; and opening the shutter which blocks the beam emitted from the laser device having received the current signal.

12. The method according to claim 8, further comprising:

calculating shape information of the target object on the basis of the interference pattern acquired from the specific frequency and the specific-frequency beam.

13. The method according to claim 8, wherein the laser device includes:

a semiconductor laser for generating the beam;

an interference signal generator which generates the interference signal for detecting the wavelength of the generated beam, and outputs the generated interference signal;

an external reflector which has the specific frequency serving as a resonance frequency, receives the generated beam, and feeding back the received beam to the semiconductor laser when a frequency of the received beam is equal to the resonance frequency; and an optical transmission unit for emitting the generated beam to an external part when the external reflector feeds back the received beam.

14. The method according to claim 8, wherein the number of laser devices is 2.

* * * * *